Sept. 11, 1951      C. MOEN      2,567,522
TUBE SECURING KEY
Filed March 25, 1950
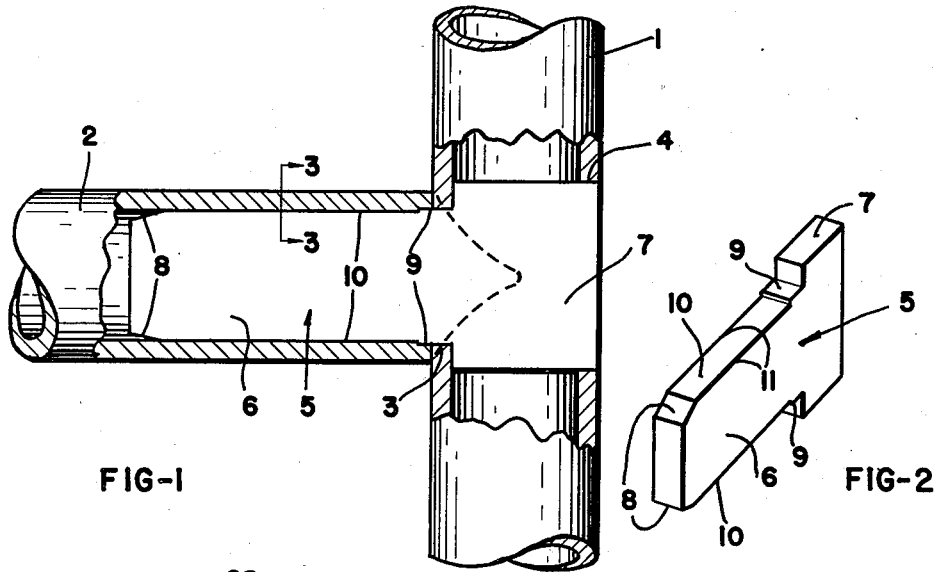
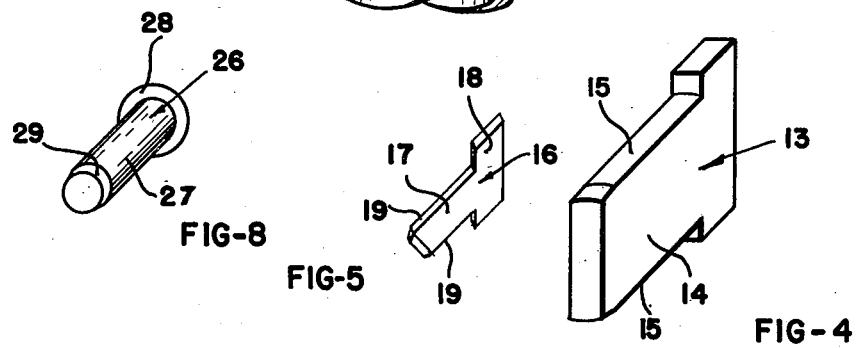
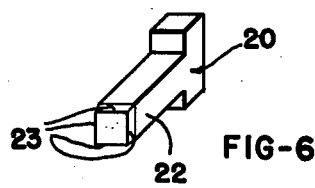
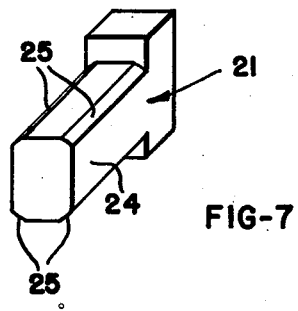
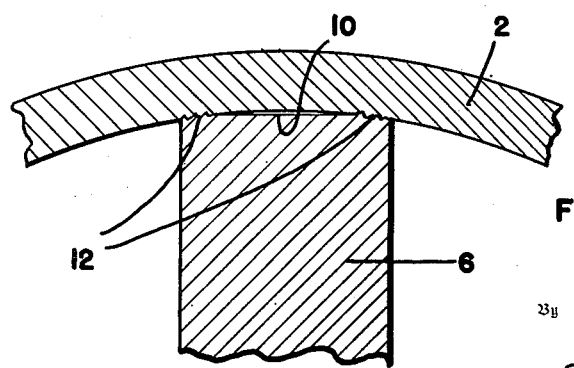
Inventor
Clarence Moen
By
*Glenn L. Fish*
Attorney Patented Sept. 11, 1951

2,567,522

UNITED STATES PATENT OFFICE 2,567,522

TUBE SECURING KEY

Clarence Moen, Spokane, Wash., assignor to Moen Ladder Company, Inc., Spokane, Wash.

Application March 25, 1950, Serial No. 151,860

8 Claims. (Cl. 287—54)

1

This invention relates to an improved fastener or key by means of which tubes are secured to each other, it being one object of the invention to provide a key which is inserted into tubes and serves to firmly hold one tube in laterally disposed relation to another.

Another object of the invention is to provide a key of such formation that it may be easily forced through a tube transversely thereof and into an end portion of another tube disposed transversely of the first tube in abutting relation thereto and firmly hold the two tubes together without it being necessary to employ welding, riveting, or other securing means.

Another object of the invention is to provide a key so formed that when it is driven through a tube transversely thereof and into an open end of a second tube abutting a side portion of the first tube movement of the key through the first tube will be limited and in addition a tight gripping engagement established between the key and portions of the two tubes engaged by edge faces of the shank of the key.

Another object of the invention is to provide a key which is formed as a unit and may be stamped from thick sheet metal and thus manufactured at low cost.

The invention is illustrated in the accompanying drawings wherein:

Fig. 1 is a view partially in side elevation and partially in section showing tubes held together by a key of the improved construction.

Fig. 2 is a perspective view of the key shown in Figure 1.

Fig. 3 is a sectional view upon an enlarged scale taken along the line 3—3 of Figure 1.

Fig. 4 through 8 are perspective views of keys having modified formations.

The tubes 1 and 2 represent two tubes forming portions of any structure which may be formed of metal tubes or pipes, and referring to Figure 1 it will be seen that the tube 2 is disposed transversely of the tube 1 with its end abutting the inner side portion of the tube 1 and so cut that it has snug fitting engagement with the tube 1 for approximately half the circumference thereof. Longitudinally extending slots 3 and 4 are formed in inner and outer side portion of the tube 1 in opposed relation to each other diametrically of the tube, the slot 4 being of somewhat greater length than the slot 3 and extending towards opposite ends of the tube equal distances beyond ends of the slot 3. When the tube 2 is to be connected with the tube 1 it is disposed transversely thereof with its end in

2 abutting engagement with the inner side portion of tube 1 and is shifted along the tube 1 until the slot 3 is enclosed by the tube 2 and extends diametrically thereof. A key 5 is then passed inwardly through the slot 4 of tube 1 and diametrically through this tube until its inner end passes through slot 3 and into the tube 2 longitudinally thereof.

The key is formed of metal and may be stamped from thick sheet aluminum or other suitable metal and has an elongated shank 6 and a head 7 at the outer or rear end of the shank. The front end of the shank has diagonally extending beveled corners 8 in order to allow the key to be readily forced into the tube 2 through the slot 3. For the major portion of its length the shank 6 of the key is of a width substantially corresponding to the diameter of the tube 2, but close to the front end of the head 7 the shank is of increased width in order to form shoulders 9 which bite into diametrically opposed portions of the inner surface of the wall of the tube and firmly grip the tube, the shoulders also having tight gripping engagement with portions of the tube 1 at opposite ends of the slot 3. Attention is also called to the fact that edge faces 10 of the shank 6 are flat and intersect the side faces of the shank at right angles thereto, thus forming the shank with sharp longitudinally extending edges 11. Since the width of the shank is substantially the same as the diameter of the tube 2 its edges 11 will cut grooves or ridges 12 in the inner surface of the wall of the tube as the key is driven forwardly into the tube and cause the tube to be more firmly held against slipping out of its proper position relative to the tube 1. The rear end of the head 7 is flush with the outer surface of the tube 1 so that it can not be grasped and pulled outwardly and as the key has tight frictional binding engagement with portions of the two tubes it will be firmly held in place without being welded to the tubes and additional means for holding the tubes in assembled relation to each other is not needed.

In Figure 4 there has been shown a key 13 which is similar to the key 5 except that its shank 14 has edge faces 15 which are arcuate transversely and the shank is not formed with shoulders at its head end corresponding to the shoulders 9 of the key 5. In this embodiment of the invention the key is driven into place, the same as key 5, and as the transversely arcuate edge faces of the shank conform to the curvature of the diametrically opposed portions of the wall of the tube 2 which they engage the key will have tight frictional grip upon the tube 2 and the two tubes cannot become separated.

The key 16 shown in Figure 5 has a shank 17 and a head 18 which are similar to the shank and the head of the key 13 and of the same length and width as those of the key 13 but its shank 17 extends diagonally from its head 18 at a downward incline and the head 18 has diagonally extending upper and lower edges 19. This form of key is used for connecting to the tube 1 a tube 2 which extends diagonally of the tube 1 at a downward incline instead of at right angles to the tube 1. The slots formed in the tube 1 will have their upper and lower ends cut to conform to the incline of the edge faces of the shank and the head of the key 16. By so forming the key 16 its shank will be directed into a downwardly inclined tube 2 when it is driven through the tube 1 and into the tube 2 and the two tubes held tightly together.

The keys 20 and 21 shown in Figures 6 and 7 are similar to those shown in Figures 2 and 4 but are thicker and while the tube 1 will be formed with an elongated opening or slot in its outer side portion to receive the heads of these keys the opening in the inner side portion of the tube must be square in order to receive the shank of these keys. The key 20 has a shank 22 which is square in cross section and its upper and lower surfaces are unobstructed throughout its length, the free end of the shank being formed with bevelled surfaces 23 so that it may be easily forced into the tube 2. The key 21 is quite similar to that shown in Figure 6 since its shank 24 is substantially square in cross section, but along its side edges this shank is formed with beveled surfaces 25 and its outer end is cut straight across instead of being formed with beveled surfaces corresponding to the surfaces 23.

Figure 8 shows another modified form of key. This key 26 resembles a rivet and has a shank 27 which is circular in cross section and a circular head 28 at its outer or rear end. Circular openings are formed in side portions of the tube 1 to receive this key and the head 28 bears against the outer surface of the tube about the opening in the outer side portion thereof. The front end of the shank 27 is beveled, as shown at 29, so that when the key is driven into place it will fit very tightly in the tube 2 and frictionally grip the wall of the tube and firmly hold tube 2 in abutting engagement with the inner side portion of tube 1.

Having thus described the invention, what is claimed is:

1. A tube, a second tube disposed transversely of the first tube with an end abutting a side portion of the first tube, the first tube being formed with a longitudinally extending inner slot disposed diametrically of the second tube and with a second longitudinally extending slot in its outer position opposite its first slot, and a key having a flat head extending through the first tube and the second slot thereof, and a flat body extending from the head and through the first slot and into the second tube longitudinally thereof, said key having portions of its head projecting from opposite side edges of the key and abutting the inner surface of the first tube adjoining opposite ends of the inner slot, and the body of the key being formed with shoulders located at its junction with the head and gripping the inner surface of the second tube.

2. A tube, a second tube extending transversely of the first tube and having one end disposed in abutting engagement with an inner side portion of the wall of the first tube, the first tube having its inner side portion formed with an opening encircled by the end of the second tube and its outer side portion formed with an opening opposite the inner opening, and a key having a head passing transversely through the first tube with its outer end fitting into the outer opening, and a shank for said key extending from the head thereof through the inner opening of the first tube and into the second tube longitudinally thereof in tight fitting frictional gripping engagement therewith to securely hold the tubes together.

3. The structure of claim 2 wherein the key is flat and is formed of hard metal and has a rectangular head and an elongated shank extending from the inner end of the head, said shank having a portion adjoining the head widened and forming extensions projecting from side edges of the shank.

4. The structure of claim 2 wherein the key has a head at its outer end and a shank extending longitudinally from the head, the free end of the shank being formed with beveled surfaces facilitating insertion of the key into tubes to be secured together.

5. The structure of claim 2 wherein the key has a head and a shank extending from the inner end of the head at a downward incline.

6. The structure of claim 2 wherein the key has a head and a shank extending longitudinally from the inner end of the head, said shank having flat side faces and transversely arcuate edge faces.

7. The structure of claim 2 wherein the key has a head and a shank extending longitudinally from the inner end thereof, the shank being substantially rectangular in cross section and having beveled longitudinally extending beveled corner portions.

8. A key for securing a tube in laterally disposed abutting engagement with anther tube, said key comprising a head of dimensions adapting it to be passed transversely through the second tube and have its outer end fitting into an opening in the outer side portion of the said tube, and a shank extending from said head and of dimensions adapting it to pass through an opening in the inner side portion of the said tube and longitudinally in the first tube with its edge faces frictionally gripping the inner surface of the wall of the last mentioned tube.

CLARENCE MOEN.

No references cited.